United States Patent [19]

Aulsebrook

[11] Patent Number: 5,197,224

[45] Date of Patent: Mar. 30, 1993

[54] LOBSTER OR LIKE MARINE CRUSTACEA TRAP

[75] Inventor: Robert J. Aulsebrook, Hilton, Australia

[73] Assignee: Ausmarine Technologies Pty. Ltd., Perth, Australia

[21] Appl. No.: 632,365

[22] Filed: Dec. 21, 1990

[30] Foreign Application Priority Data

Dec. 22, 1989 [AU] Australia .............................. PJ7943
Jan. 26, 1990 [AU] Australia .............................. PJ8342

[51] Int. Cl.$^5$ ........................................... A01K 69/08
[52] U.S. Cl. ..................................................... 43/100
[58] Field of Search .................. 43/100, 102, 103, 104, 43/105

[56] References Cited

U.S. PATENT DOCUMENTS

| | | | |
|---|---|---|---|
| 1,956,225 | 4/1934 | Oldham | 43/100 |
| 4,107,867 | 8/1978 | Kennedy | 43/100 |
| 4,159,591 | 7/1979 | Plante | 43/100 |
| 4,611,424 | 9/1986 | Tarantino | 43/100 |
| 4,711,050 | 12/1987 | Galgama | 43/102 |
| 4,897,953 | 2/1990 | Bruce | 43/100 |

FOREIGN PATENT DOCUMENTS

| | | | |
|---|---|---|---|
| 136332 | 6/1976 | Japan | 43/100 |
| 16379 | 5/1907 | Norway | 43/100 |

Primary Examiner—Kurt C. Rowan
Attorney, Agent, or Firm—Greenlee and Winner

[57] ABSTRACT

A combined trap for lobsters and like marine crustacea and for octopi and like cephalopods comprising integrally constructed marine crustacea and cephalopod enclosures having a barrier therebetween to prevent cephalopods in the cephalopod enclosure passing into the crustacea enchlose. The crustacea enclosure is constructed to permit viewing from outside thereof of bait and/or crustacea in the crustacea enclosure to lure cephalopods to the trap. The combined trap provides independent entry to the respective enclosure with the entry to the cephalopod enclosure being constructed to occlude exit therethrough from the cephalopod enclosure of octopi and like cephalopods.

16 Claims, 3 Drawing Sheets

LOBSTER OR LIKE MARINE CRUSTACEA TRAP

BACKGROUND OF THE INVENTION

This invention relates to a trap for the harvesting of marine crustacea which also incorporates a trap for octopi and like cephalopods.

Octopi and other cephalopods are predators of lobsters and other crustacea, and in many areas the octopi attack the lobsters after they have been caught in sea bed traps, commonly referred to as pots. Having regard to the different characteristics of lobsters and octopi, the latter may readily escape from pots after having damaged the lobsters therein to a degree to render them nonsaleable in a commercial manner.

Accordingly, it would be desirable to construct a pot or trap for lobsters in a manner to permit the entry of the lobsters but prevent entry of octopi. However, lobsters are timid and wary of openings which require forced entry, due in part to the rigid properties of the lobster shell, while octopi are quite aggressive and will force entry into restricted areas where food is located. The octopus is also a boneless creature and, accordingly, its body can be substantially altered in shape to facilitate passage through restricted areas.

Also there is a substantial market for octopi and it would be commercially attractive to make use of the attraction of octopi to trapped lobsters as a lure for also trapping octopi.

It is therefore the object of the present invention to provide a trap which is suitable for trapping both octopi and other like cephalopods and also marine crustacea wherein the attraction of the octopi to marine crustacea may be used as a lure for the trapping of the octopi and other like cephalopods.

SUMMARY OF THE INVENTION

With this object in view, there is provided according to the present invention a combined trap for marine crustacea and for octopi and like cephalopods comprising integrally constructed respective marine crustacea and cephalopod enclosures with a barrier means therebetween to prevent the passage of cephalopods from within the cephalopod enclosure to the crustacea enclosure, the crustacea enclosure being constructed to permit the viewing from externally thereof of bait and/or crustacea in the crustacea enclosure, and independent entry means to the respective enclosures and at least the entry means to the cephalopod enclosure being adapted to occlude exit therethrough from the cephalopod enclosure of octopi and like cephalopods.

For convenience hereinafter the word "lobster" is to be understood to include "all like marine crustacea" and the word "octopi" is to be understood to include "all like cephalopods."

Preferably the trap is configured to, in use, lie on the seabed and thus conveniently has a bottom wall that is generally flat. The entry means to the octopi enclosure being located in a perimetal wall, upstanding from the bottom when the trap is in use, and is preferably below or not substantially above the mid-height of the trap.

The entry means to the octopi enclosure includes a port and a pivotal or deflectable closure member which will yield to an octopus endeavoring to pass through the entry port to enter the octopi enclosure and then return to close the entry port after passage of an octopus through the port, thereby trapping the octopus within the enclosure. Conveniently, the octopi enclosure communicates with the entry port via a passage having a second closure spaced inwardly from the entry port closure. The second closure is also pivotable or deflectable to permit octopi to pass from the passage into the octopi enclosure and prevent passage in the opposite direction from the octopi enclosure.

The lobster enclosure has a conventional-type entry opening without a closure, and preferably has a false bottom spaced upwardly from the actual bottom to provide therebetween a secondary lobster enclosure for undersize lobsters. The false bottom is constructed of a series of spaced parallel bar-like members. The spacing is selected in accordance with the minimum size of lobster permitted to be trapped, and so all lobster below the minimum size can pass between the members to enter the secondary lobster enclosure for subsequent release.

This separation of the undersized lobster within the trap avoids the manual handling and sizing of the total lobster catch, when the trap is raised to the surface. Such handling can cause trauma to undersized lobsters that may seriously interfere with their subsequent development of even cause the death thereof. Thus this feature of the trap is particularly desirable as it essentially prevents the trapping of undersize lobsters that ma enter the trap independently of the actions of the trapper.

A release door is preferably provided in the secondary enclosure that can be opened to permit the undersize lobsters to escape, such as while the trap is being raised from the seabed. The release door can be constructed to open automatically as the trap is being raised, such as the result of the trap being lifted off the seabed. Preferably the release door is provided in the bottom wall of the secondary enclosure and is pivotal relative thereto to swing downwardly as the trap is raised. This presents a substantial opening in the bottom of the secondary enclosure through which the undersized lobsters fall to freedom as the trap is being raised. In this way, the undersized lobsters are subjected to a minimum of trauma as a result of being caught in the trap and subsequently released by human handling.

In use, bait will be provided in the trap to entice the lobster to enter same; however, no specific bait is required in the octopi enclosure as the octopi will be attracted by the lobster caught in the lobster enclosure and/or by bait provided therein to attract lobsters. The octopi, being a seabed scavenger, will move about the perimeter of the trap in search of access to the lobsters or bait in the lobster enclosure. In this search the octopi will come across the entry to the octopi enclosure and the yieldable nature of the closure to the entry will lead to the octopi forcing the entry closure to deflect, whereafter the octopi can enter the octopi enclosure in the hope of gaining access to the lobster or bait in the lobster enclosure.

It is to be understood that the above-described trap with a secondary enclosure below the lobster enclosure with the appropriately spaced bars therebetween to release undersize lobster may be constructed and used with an integral octopi trap.

Thus according to another aspect of the present invention there is provided a lobster trap having superimposed integral upper and lower enclosures, the upper enclosure having an opening for the entry thereto of lobsters, a separation structure between the enclosures forming the floor of the upper enclosure and the roof of the lower enclosure, said separation structure being constructed to permit only lobsters within the upper enclosure and below a preselected physical size to pass through the separation structure into the lower enclosure.

Preferably a door is provided in the lower enclosure selectively operable while the trap is being raised from the seabed to permit escape from the lower enclosure of the undersized lobster therein.

Conveniently, the door is hinged to the structure of the lower enclosure to pivot downwardly when released and the trap is being raised. Preferably the pivot axis is located forward and transverse to the direction of movement as the trap is being raised. The door is preferably of an open framework construction such as a perimeter member and a plurality of spaced bars spanning therebetween so that the water pressure on the door as the trap is being lifted is not sufficient to hold the door in the closed position.

There can be provided a member connected to the door and positioned transverse to the direction of movement as the trap is being lifted. The disposition and configuration of the member is such that the force applied thereto by the water pressure as the trap is lifted will be transmitted to the door a force to pivot the door to the open position and maintain the door open as the trap is being lifted. The member is preferably rigidly secured to the door or formed integral therewith.

Deflector or director means may be provided to cause a flow of water to impinge on the member as the trap is being raised. The deflector or director means increase the pressure and/or velocity of the water on the flap to ensure opening of the door and the maintenance of the door open at least until the trap is near to the surface.

There may be provided a skid plate extending across the bottom of the trap that may form part of the floor of the lower enclosure. The lower enclosure may have two doors, each supported and hinged in similar manners as described above. The two doors together may form the major segment of the floor of the lower enclosure and may be located one on either side of the skid plate.

BRIEF DESCRIPTION OF THE DRAWINGS

The invention will be more readily understood from the following description of one practical arrangement of a combined octopi and cray (crustacean) trap with reference to the accompanying drawings.

DETAILED DESCRIPTION OF THE INVENTION

Figure 1:
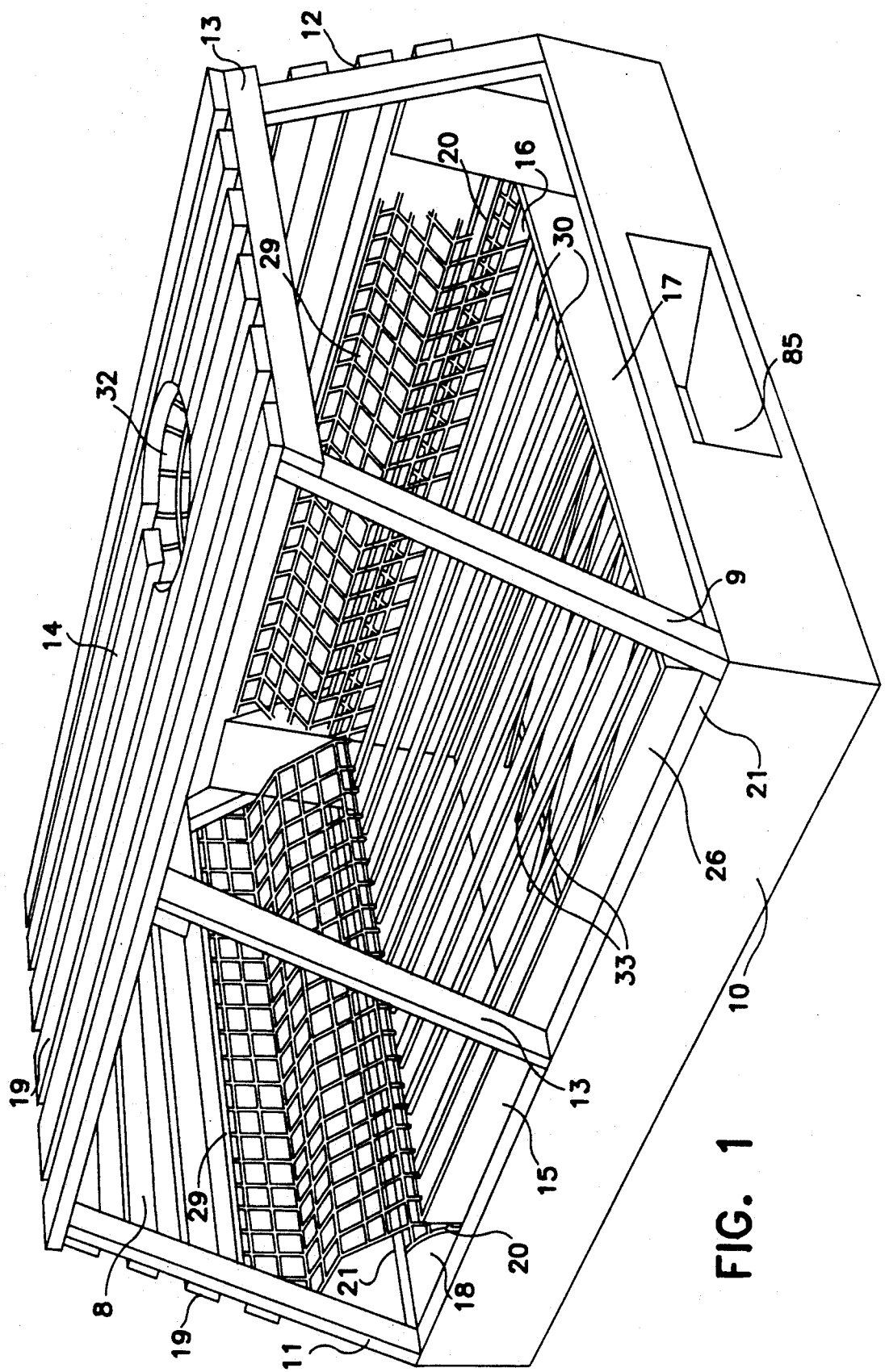
FIG. 1 is a perspective view of a cray pot or trap in which there is incorporated an octopi trap.

Referring now to the drawings, there is depicted in FIG. 1 a trap specifically constructed for catching lobster and octopus and of a basically wooden construction. The trap comprises a generally rectangular base portion 10 with two opposite side walls 11 and 12 upwardly and inwardly inclined to define a narrower top 14. The end walls 8 and 9 are vertical. At the lower end of each of the inclined sides 11 and 12 and ends 8 and 9, there is provided respective upward open enclosures 15, 16, 17 and 18 provided for the purpose of trapping octopi.

Each of the octopi enclosures 15, 16, 17 and 18, are of a generally rectangular cross-section and extend the length of respective sides of the base 10 of the trap. The octopi enclosures are formed on the bottom and two sides by wooden boards or other suitable material which may be relatively fine mesh material or which may be of an appropriate thermoplastic material, or metal, or a plastic coated metal mesh, each of which is desirably of a material resistant to deterioration by normal sea water. Where mesh is used, the opening therein must be small enough that the tentacles of an octopus will not pass therethrough.

The side ends and top 11, 12, 8, 9 and 14 are made of wooden slats 19 on wooden frames 13. The slats 19 are removed from side 11 and end 9 in FIG. 1 for clarity.

In the configuration shown, each octopi enclosure 15, 16, 17 and 18 has the closure flap 20 secured to the upper edge of the outer wall 21 of the octopi enclosure and extends across the opening 23 forming the top of the octopi enclosure to engage the inside of the inner vertical wall 26 of the octopi enclosure. This can be best seen in FIG. 2. The closure flap 20 is of a resiliently deflectable nature so that an octopus endeavouring to reach the lobster in the central area of the trap and making contact with the flap 20 will cause the flap to deflect inwardly and downwardly to provide an opening between the flap and the inner wall 26 through which the octopus can enter the octopi enclosure 15.

It is to be noted that the flap 20 is made of a mesh material which may be of the type above referred to in relation to the sides of the trap, and is of a width to take up a curved cross section with the lower edge resting against the inner wall 26 of the octopi enclosure. After an octopus has gained access to enter the enclosure 15, the flap 20 will assume its undeflected position shown in FIG. 2, thereby trapping the octopus in the octopi enclosure 15.

In order to entice the octopus to seek access to lobsters in the central area of the trap via the area above the closure flap 20, the portion of the sides and ends of the trap immediately above the closure flap 20 is made of a mesh panel as indicated at 29. The mesh used in the panel 29 may be of the form above described, and must be such that the tentacles of octopi cannot pass therethrough. The mesh panel is secured at the lower end to the inner wall 26 and at the upper end the lower one of the slats 19 of the side or end of the trap. The mesh panels in these areas makes the lobsters or bait in the trap more readily seen by an octopus.

The enclosure 31 formed by the area bound by the inner wall 26 and the side and end walls 11, 12, 8 and 9, top 14 and slatted base 30 is to hold lobsters that enter through the entry 32 provided in the top 14, thus constituting the lobster enclosure.

The basic construction of the lobster enclosure shown in FIG. 1 can employ a wooden frame which is covered with slats or a mesh or a woven cane cladding in a known manner. However, it can also be modified by providing below the slatted base 30 a further false bottom spaced a distance thereabove, with the false bottom being formed by a plurality of space bars 33. The slats of the base 30 are spaced apart a distance so that undersized lobsters can pass between the bars to the area below the base 30, as has been described earlier in this specification. The bars forming the false bottom may be arranged in the form of a door which will naturally fall open when the craypot is lifted from the seabed, thereby allowing the undersize lobster which have passed between the slats of the base bottom, to escape whilst the craypot is being raised to the surface. The construction and operation of the doors will be further described hereinafter with reference to FIGS. 3, 4 and 5.

Figure 3:
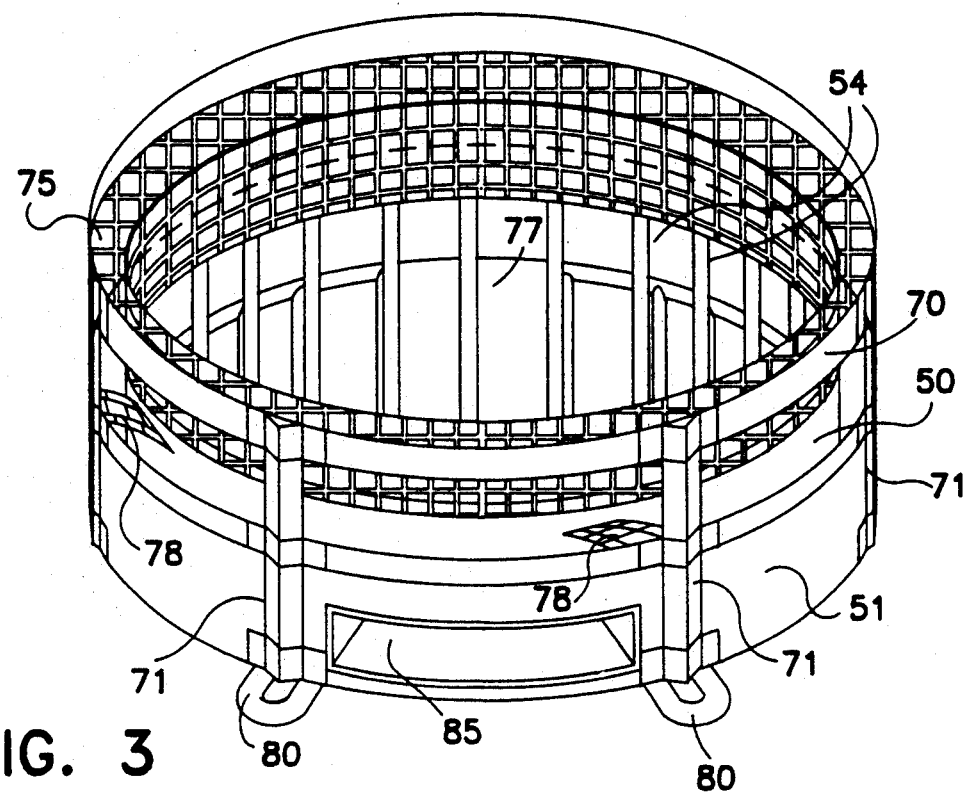
FIG. 3 is a perspective view of the another construction of a combined lobster and octopi trap with the upper portion of the upper portion removed for the purpose of clarity.

Referring now to FIG. 3 of the drawings, wherein there is shown an alternative construction of combined lobster and octopus trap of generally cylindrical form. In FIG. 3 the upper part of the trap has been removed for the sake of clarity in the following description. The lower portion of the trap has inner and outer walls 50 and 51 each made of sheet metal with an annular base 52 also of sheet metal extending therebetween and secured thereto to form an area in which octopus can be trapped as hereinafter further described. The base 52 may be provided with a series of spaced arcuate slots (not shown) arranged to maintain the required integrity and strength in the base 52 whilst allowing the free passage of water therethrough as the trap is being raised or lowered with respect to the seabed.

Extending across the area defined by the inner wall 50, approximately at the level of the upper edge thereof, are a plurality of spaced bars 54 which form the floor of the upper enclosure of the lobster trap. These bars 54 are spaced apart a distance determined by the legal requirement as to the minimum size of lobsters permitted to be trapped so that undersized lobsters can pass between the bars 54 into the area therebelow which forms the lower enclosure.

Figure 6:
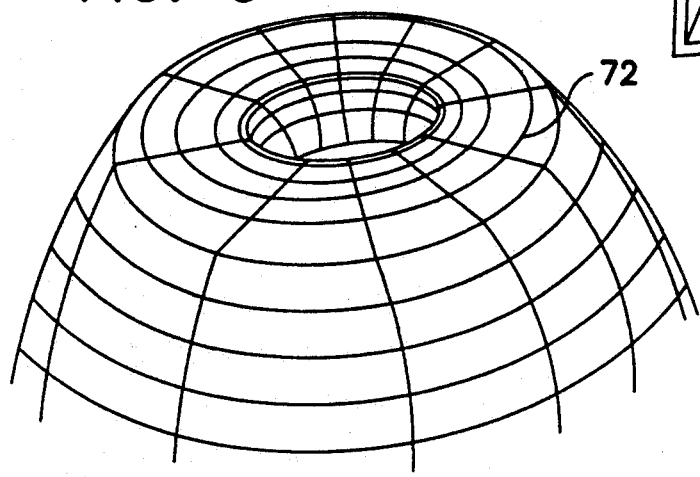
FIG. 6 is a schematic perspective view of the upper portion of the trap shown in FIG. 3.

The upper cover 72 of the trap is shown diagrammatically in FIG. 6. The lower perimeter thereof is welded to the perimetal band 70 spaced upward from the outer wall 51. A plurality of perimetally-spaced posts 71 support the band 70 and are welded to the outer wall 51 and band 70 to form a rigid structure. If the upper cover 72 is made of metal it may also be welded to the perimetal band 70 or if made of cane or another nonmetal, it can be suitably laced or lashed to the perimetal band 70.

The mesh sleeve 75 is of cylindrical form complementary to the upper edge of the inner wall 50 and is secured thereto, such as by welding. The sleeve extends upwardly from the inner wall 50 and then outwardly to the inner face of the band 70 to which it is secured, again as by welding.

The above-described combination of the inner wall 50, floor bars 54, sleeve 75, perimetal band 70, and upper cover 72 form the lobster enclosure 77 that lobsters may enter through the mouth or entry 73 in the upper cover 72. The mesh sleeve 75 provides ready viewing of the interior of the lobster enclosure 77 so lobsters therein will lure octopi to approach the trap.

Figure 4:
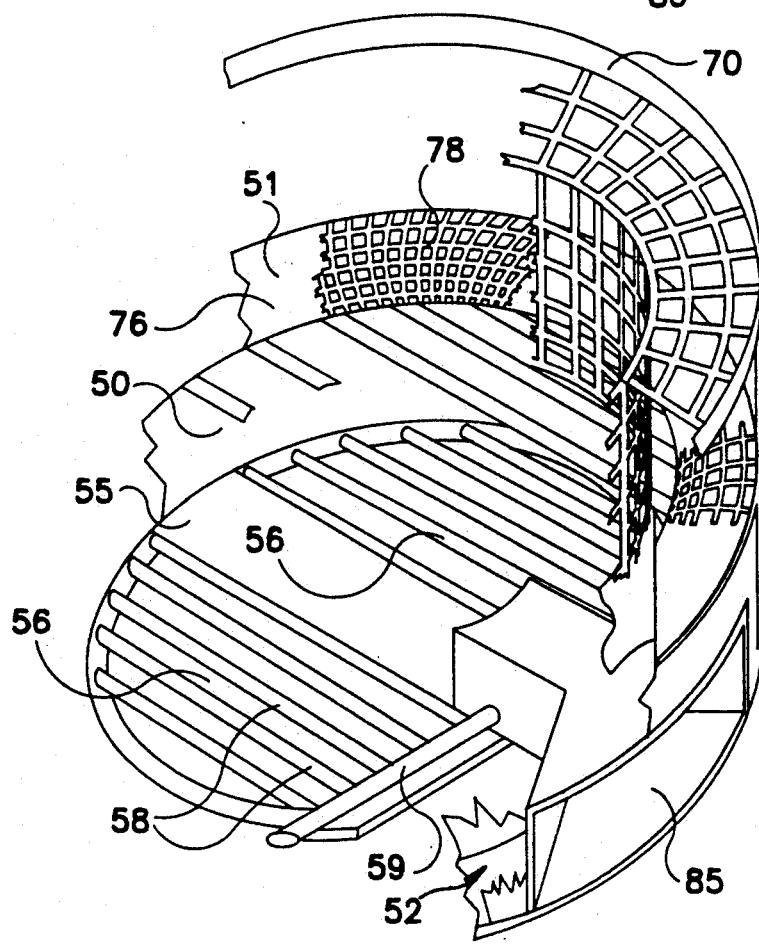
FIG. 4 is a perspective sectioned view of the trap as shown in FIG. 3.

The open topped annular cavity formed by the inner and outer walls 50, 51 and the annular base 52 provide an octopi enclosure 76 integral with the lobster enclosure 77. The closure flap 78, shown only in part in FIGS. 3 and 4, is secured to the upper marginal area of the outer wall 50 and extends downwardly across the cavity to contact the inner wall 51.

Figure 2:
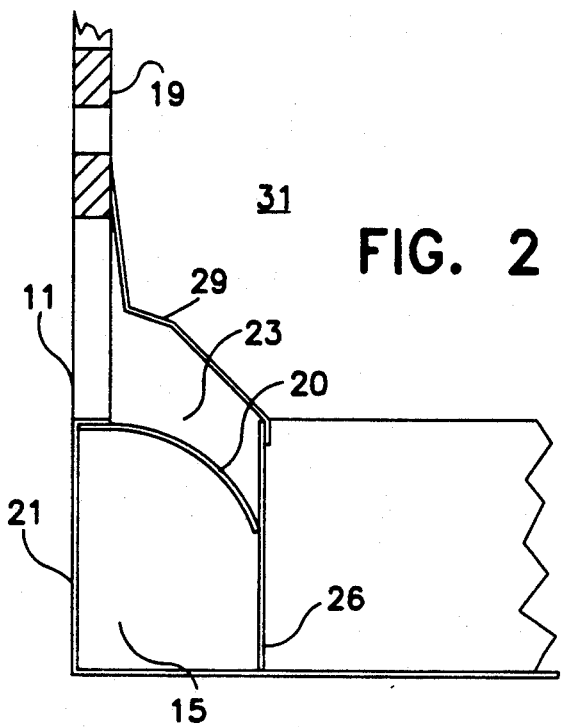
FIG. 2 is a diagrammatic cross-sectional view of the octopi trap region of the combined trap as shown in FIG. 1.

The closure flap 78 is preferably made of a mesh material that can be resiliently deflected inwardly with respect to the walls of the octopi enclosure 76 to permit entry of an octopus thereinto. The mesh may conveniently be of a suitable thermoplastic material with sufficient resilience to deflect under the weight of an octopus to permit passage of the octopus into the enclosure and to return the closure flap to the closed position. The previous description of the operation of the closure flap of the octopi enclosure in relation to the embodiment shown in FIGS. 1 and 2 is also applicable to the closure flap 78 in FIGS. 3 and 4.

A centrally positioned skid bar 55 extends generally diametrically across the underside of the lobster trap between the lower edges of the outer wall 51, and secured both to the outer wall 51 and the inner wall 50. The skid bar 55 provides strength to the lower portion of the lobster trap and is particularly appropriate when the trap is being raised from the sea bed by a cable attached to the towing eyes 80 provided on the trap.

The skid bar 55 divides the bottom of the lower enclosure into two generally semi-circular areas in each of which is provided a hinged door 56. Each door is formed by a plurality of bars 58 are secured to and extending from the straight front bar 59. The front bar 59 of each of the doors 5 is formed integral and is pivotally supported at its respective ends to the inner wall 50.

This pivotal support permits the doors 56 to pivot between a closed position spanning and generally forming a bottom closure to the lower enclosure, defined by the inner wall 50 and a downwardly inclined position where the rear ends of the doors 56 are spaced downwardly from the lower edge of the inner wall 50. This permits the escape of undersized lobsters that have entered the lower enclosure from the upper lobster enclosure by passing between the bars 58.

A suitable stop may be provided to limit the extent of downward pivotal movement of the respective doors so that when in the open position, they still occupy a downwardly inclined or trailing relationship with respect to the pivot axis of the forward end of the doors. Such stops are not shown in the drawing.

The doors with central skip bars as described above with respect to FIGS. 3 and 4 may also be incorporated into the trap previously described with reference to FIGS. 1 and 2. Alternatively, the skid bar may be omitted and a single door used.

Figure 5:
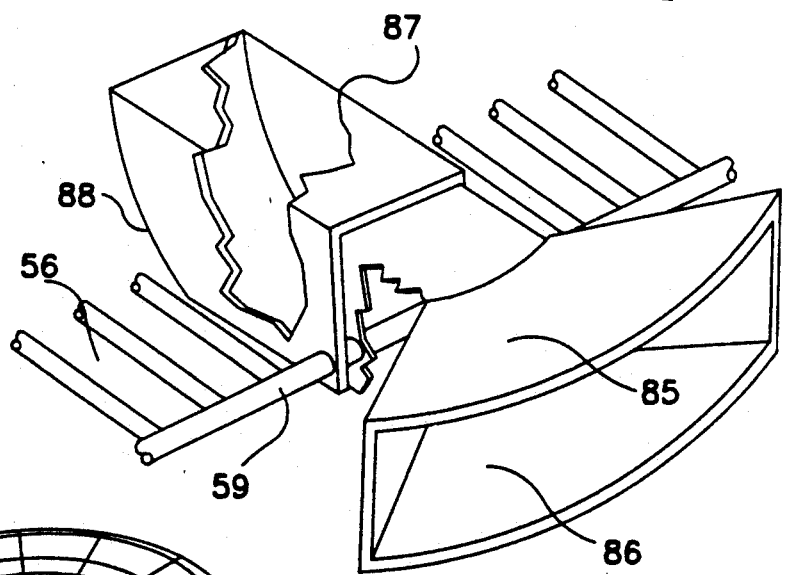
FIG. 5 is a detail sectional view of the water pressure passage as shown in FIG. 4.

In order to ensure that the doors 56 open effectively, as the trap is being raised to the surface, a construction as shown in detail in FIG. 5 may be incorporated in the trap.

A converging passage 85 is provided extending through the inner and outer walls 50, 51 from the mouth 86 in the outer wall 51. The pressure box 87 is rigidly attached to the bar 59 and the open front thereof is aligned with the inner end of the passage 85 to receive the water flowing through the passage as the trap is being raised. The force so applied to the upwardly curved end wall 88 of the pressure box 87 applies a turning movement to the bar 59 to rotate the doors 56 in a direction to open and release undersized lobsters in the lower enclosure. This construction of doors in the area below the lobster enclosure enables the undersized lobsters to be released as the trap is being towed to the surface so that they are subjected to a minimum of trauma.

It will be appreciated that the construction of a lobster trap as above-described with reference to the drawings incorporating provision for the release of undersized lobsters may be used with or without the incorporation of the octopi trap. Thus, in some situations the trap may be constructed solely as a lobster trap.

It is to be understood that in this specification, reference to lobsters includes crayfish, lobster and other like marine crustaceans and the reference to octopi also includes like marine cephalopods.

I claim:

1. A combined trap for crustacea and cephalopods comprising integrally constructed respective marine crustacea and cephalopod enclosures with a barrier therebetween to prevent the passage of cephalopods from one enclosure to the other enclosure, the marine crustacea enclosure being constructed to permit the viewing from externally thereof of bait or crustacea in the crustacea enclosure, and independent entry openings to the respective enclosures and at least the entry port to the cephalopod enclosure being adapted to occlude exit therethrough from the cephalopod enclosure of cephalopods.

2. A combined trap as claimed in claim 1 wherein the cephalopod enclosure is located along at least part of a perimetal wall of the crustacea enclosure with said part of the perimetal wall forming the barrier.

3. A combined trap as claimed in claim 1 wherein the crustacea enclosure is a generally circular cross-section with a substantially cylindrical perimetal wall, said cephalopod enclosure being located about at least part of said cylindrical perimetal wall with the perimetal wall forming the barrier between the enclosures.

4. A combined trap as claimed in claim 1 wherein the entry opening to the cephalopod enclosure is upwardly directed and a closure member is provided to span said entry opening, said closure member being constructed to be biased to a position to normally close the entry opening against the escape of cephalopod from the cephalopod enclosure.

5. A combined trap as claimed in claim 4 wherein the closure member is resiliently deflectable and is arranged to permit inward deflection thereof to provide access to the cephalopod enclosure.

6. A combination trap as claimed in claim 4, wherein the closure member is in the form of a flap secured along one edge to one wall of the cephalopod enclosure and extending across the entry opening so the opposite edges engage the opposite wall to close the entry opening, the flap being resiliently deflectable to permit said opposite edge to deflect inwardly to be spaced from said opposite wall to provide access to the cephalopod enclosure.

7. A combined trap as claimed in claim 4 wherein the closure member constructed is of a mesh material.

8. A combined trap as claimed in claim 4 wherein the wall of the crustacea enclosure immediately above the entry opening to the cephalopod enclosure is constructed of a mesh material.

9. A combined trap as claimed in claim I wherein the base of the crustacea enclosure is of a grill construction with the openings formed by the grill dimensioned so that only crustacea below a predetermined size can pass therethrough to escape from the crustacea enclosure.

10. A combined trap as claimed in claim 9 including a holding enclosure below the crustacea enclosure and separated therefrom by said grill base of the crustacea enclosure, said holding enclosure retaining crustacea that pass through the grill from the crustacea enclosure.

11. A combined trap as claimed in claim 1, wherein the crustacea enclosure has a base constructed to separate the crustacea enclosure from a holding enclosure integral with and located below the crustacea enclosure, said base being constructed to permit only crustacea below a predetermined physical size to pass therethrough into the holding enclosure.

12. A combined trap as claimed in claim 10, wherein the holding enclosure has an escape door provided therein arranged to open in response to the trap being raised from the seabed to thereby permit crustacea to escape from the holding enclosure as the trap is being raised.

13. A combined trap as claimed in claim 11, wherein the holding enclosure has an escape door provided therein arranged to open in response to the trap being raised from the seabed to thereby permit crustacea to escape from the holding enclosure as the trap is raised.

14. A crustacea trap having superimposed integral upper and lower enclosures, the upper enclosure having an opening for the entry thereto of crustacea, a separation structure between the enclosures forming the floor of the upper enclosure and the roof of the lower enclosure, said separation structure being constructed such that an opening into the lower enclosure from the upper enclosure is smaller than the opening into the upper enclosure to permit only crustacea within the upper enclosure and below a preselected physical size to pass through the opening of the separation structure into the lower enclosure.

15. A crustacea trap as claimed in claim 14 wherein the separation structure is of a grill construction with the openings formed by the grill dimensioned so that only crustacea below a predetermined size can pass therethrough to escape from the crustacea enclosure.

16. A crustacea trap as claimed in claim 13 wherein the lower enclosure has an escape door arranged to open in response to the trap being raised from the seabed to thereby permit crustacea to escape from the lower enclosure as the trap is being raised.

* * * * *